April 15, 1941.　　　　J. V. SCHRAIG　　　　2,238,709
STUFFING GLAND BOSS
Filed April 27, 1939
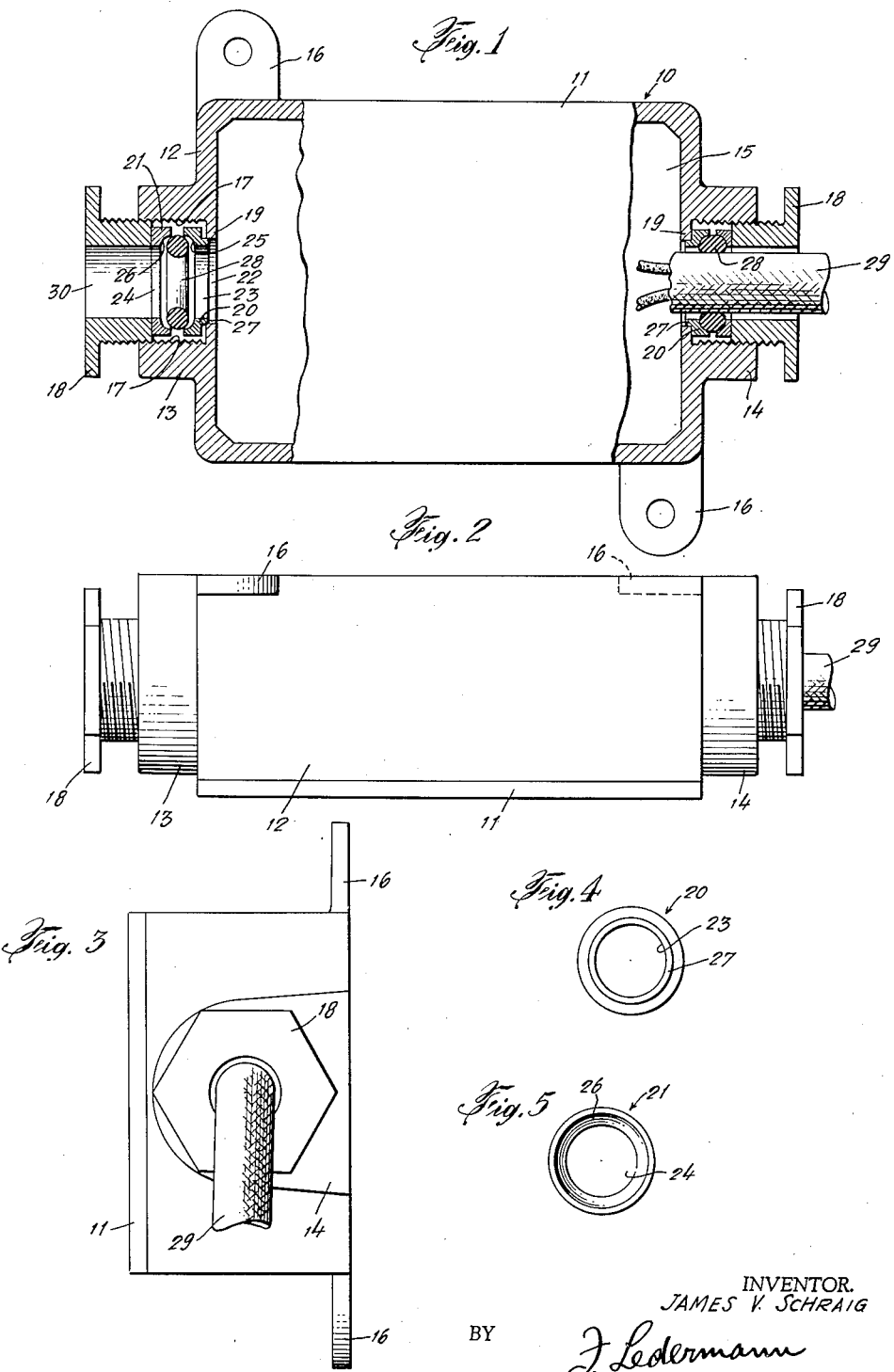
INVENTOR.
JAMES V. SCHRAIG
BY
J. Ledermann
ATTORNEY.

UNITED STATES PATENT OFFICE 2,238,709

STUFFING GLAND BOSS

James V. Schraig, Central Valley, N. Y.

Application April 27, 1939, Serial No. 270,433

1 Claim. (Cl. 285—46)

This invention relates to watertight electrical connectors and aims to provide a stuffing gland boss feature whereby the bosses on the box are so constructed as to include the watertight compartment wherein particularly designed and movable dual grommets are inserted and the threaded extension nut forces these dual grommets to compress the packing against the cable, thus providing a single unit watertight stuffing gland boss.

A double grommet, or in other words, a pair of complementary grommets, each having a central opening therethrough of the same size, the size of this opening being commensurate with the size of the cable being used, makes for an interchangeable grommet opening size that fits any required size of cable without changing the drilling and tapping in the boxes. The changes are effected by changing the removable dual grommets and the extension nut according to the size of the opening through the latter, an assortment of dual grommets and extension nuts being provided with vari-sized openings therethrough. Thus, the same box may be used for any size wire within a relatively wide range, whereby the necessity of having a wide variety of different sized boxes and stuffing glands is eliminated.

The above and other objects will become apparent in the description below, in which characters of reference refer to like-numbered parts on the accompanying drawing.

Referring briefly to the drawing,

Figure 1 is a plan view, partly in section, of a box constructed in accordance with the present invention.

Figure 2 is an inverted side elevational view of the same.

Figure 3 is an end view of Figure 1.

Figure 4 is a view of the inner grommet per se as seen looking in the direction of the arrow in Figure 1.

Figure 5 is a view of the outer grommet as seen looking in the same direction.

Referring in detail to the drawing, the numeral 10 represents a box having the removable cover 11. In the peripheral wall 12 of the box one or more bosses 13 and 14 are formed integral with the wall 12. The entire box, including the base 15, the wall 12, the ears 16 whereby the box is secured to a support, and the bosses 13 and 14, are cast in one piece. In the box illustrated, two oppositely disposed bosses are shown, although any desired number may be provided in any desired peripheral arrangement, and of course the box may have any desired peripheral outline.

Each boss 13 and 14 is provided with a threaded opening 17 therethrough, into which a standard hollow threaded extension nut 18 is threadable. A peripheral flange 19 is provided at the inner end of the opening through the boss, flush with the inner surface of the wall 12.

A pair of grommets 20 and 21 are adapted to be set loosely in the opening through the boss, and their outer diameters, which are standard and uniform, are greater than the diameter of the opening 22 through the flange 19. Both grommets 20 and 21 and the nut 18 have, in every case, central openings therethrough whose diameters are identical, as shown at 23, 24, and 30 respectively. The mutually opposed inner peripheral edges of both grommets are complementarily concavely beveled to provide opposed annular cup-like peripheral pockets 25 and 26, respectively. Figure 5 shows this construction in the case of the grommet 21; however, the grommet 20 would present an identical picture if it were shown looking at it in the direction opposite to that indicated by the arrow in Figure 1.

The inner peripheral edge of the grommet 20 opposite to the bevel 25, is provided with an extension flange 27 which is adapted to register in the opening 22 through the flange 19. Watertight packing, which for the sake of simplicity is represented in the form of a ring 28, is provided between the grommets 20 and 21.

In the boss 13 the nut 18, grommets 20 and 21, and the packing 28, are all shown in spaced apart relationship, as they appear when loosely assembled without a wire or cable inserted through the openings of these parts into the box. In the boss 14 the same parts are shown completely assembled and tightened down about a cable 29. As the nut 18 is screwed home, its peripheral wall forces the flange 27 of the grommet 20 into the opening through the flange 19, and forces the rounded bevels 25 and 26 to clamp the packing 28 therebetween, in doing which they force the ring 28 to bulge against the surface of the cable 29, thus assuring a firm and watertight connection of the cable in the box.

If the same box is to be used to accommodate cables or wires of different diameter, identical pairs of grommets are used, but their internal diameters, i. e., of the openings 23 and 24 (which are always identical for the two grommets of each pair 20 and 21) will be proportionately different, to accommodate the size of the wire or cable. The nut 18 must then also be changed for a new nut identical with the first excepting that the diameter of the opening 30 is equal to that of the new grommet openings 23 and 24.

As such pairs of grommets and their appropriate nuts may easily be provided and stocked, of varying internal diameters, the same box may be used for varying sizes of wires or cables. This means that, in planning for the installation of such boxes, instead of having to figure out what size drilling and tapping must be had for each point in the circuit or circuits, all the boxes are of the same size, and they might even be installed and secured in place before the actual connections are ready to be made. The present invention, consequently, provides for a standardization and interchangeability, without changing the drilling and tapping, of boxes with such bosses.

Obviously, modifications in form and structure may be made without departing from the spirit and scope of the invention.

I claim:

An outlet box having an exterior counterbored boss providing an interior shoulder and adapted to receive an end of a conduit, means for securing said conduit in said box comprising a pair of grommets, one of said grommets being provided with a shoulder for engagement with the shoulder in the box and an axial flange serving as a lining for the smaller portion of the bore, a distortable packing located between the grommets, and means for distorting said packing into close engagement with said conduit.

JAMES V. SCHRAIG.